US012368750B2

(12) United States Patent
Jensen et al.

(10) Patent No.: US 12,368,750 B2
(45) Date of Patent: Jul. 22, 2025

(54) INTELLIGENT MANIPULATION OF DENIAL-OF-SERVICE ATTACK TRAFFIC

(71) Applicant: Level 3 Communications, LLC, Broomfield, CO (US)

(72) Inventors: Christian Jensen, Westminster, CO (US); Michael Feldpusch, Murrells Inlet, SC (US)

(73) Assignee: Level 3 Communications, LLC, Denver, CO (US)

(*) Notice: Subject to any disclaimer, the term of this patent is extended or adjusted under 35 U.S.C. 154(b) by 195 days.

(21) Appl. No.: 18/484,848

(22) Filed: Oct. 11, 2023

(65) Prior Publication Data

US 2024/0146762 A1 May 2, 2024

Related U.S. Application Data

(60) Provisional application No. 63/381,833, filed on Nov. 1, 2022.

(51) Int. Cl.
    *H04L 9/40* (2022.01)
(52) U.S. Cl.
    CPC ............... *H04L 63/1458* (2013.01)
(58) Field of Classification Search
    CPC ...... H04L 63/1458; H04L 63/20; H04L 45/02
    See application file for complete search history.

(56) References Cited

U.S. PATENT DOCUMENTS

| | | | |
|---|---|---|---|
| 2002/0083175 A1 | 6/2002 | Afek | |
| 2005/0249214 A1* | 11/2005 | Peng | H04L 63/1458 709/224 |
| 2013/0139214 A1* | 5/2013 | Chesla | H04L 63/1441 726/1 |
| 2018/0124099 A1* | 5/2018 | St. Pierre | H04L 63/20 |
| 2019/0288984 A1* | 9/2019 | Hajduczenia | H04L 61/5007 |
| 2020/0007575 A1 | 1/2020 | Meriot | |
| 2021/0084068 A1* | 3/2021 | Teng | H04L 45/122 |
| 2024/0146762 A1* | 5/2024 | Jensen | H04L 63/0227 |
| 2024/0214416 A1* | 6/2024 | Tracy | H04L 63/1425 |

FOREIGN PATENT DOCUMENTS

| | | | |
|---|---|---|---|
| CN | 101674312 | 3/2010 | |
| WO | WO-2016035083 A2 * | 3/2016 | G06F 21/55 |

OTHER PUBLICATIONS

International Search Report and Written Opinion of the International Searching Authority, dated Feb. 1, 2024, Int'l Appl. No. PCT/US2023/076561, Int'l Filing Date Oct. 11, 2023; 13 pgs.

* cited by examiner

*Primary Examiner* — Hee Soo Kim (57) ABSTRACT

Systems and methods for improved intelligent manipulation of distributed-denial-of-service (DDoS) attack traffic are provided. In implementations, a method may include receiving, at a traffic management system, a mirrored first stream of packets from a router on a first link and a mirrored second stream of packets from the router on a second link. The method may further include determining flow information about the first stream. In examples, the flow information may indicate that a challenge to a particular source IP address has been issued to test the legitimacy of the source IP address. The method may further include sending, by the traffic management system, a routing policy update based on the flow information.

20 Claims, 4 Drawing Sheets

INTELLIGENT MANIPULATION OF DENIAL-OF-SERVICE ATTACK TRAFFIC

CROSS-REFERENCE TO RELATED APPLICATIONS

This application claims the benefit of U.S. Provisional Application No. 63/381,833 filed Nov. 1, 2022, entitled "Intelligent Manipulation of Denial of Service Attack Traffic," which is incorporated herein by reference in its entirety.

BACKGROUND

A distributed-denial-of-service (DDoS) attack may include a malicious attempt to disrupt the normal operation of a targeted server, service, and/or network. DDoS attacks may be volumetric attacks or non-volumetric attacks. A flood or volumetric DDoS attack generally utilizes multiple computing systems as sources of traffic to overwhelm the resources of a particular target system. Non-flood or non-volumetric DDoS attacks include queries focused on over-burdening or exhausting specific resources of a system. Carrying out a DDoS attack may also include taking control of multiple computing machines, potentially including internet-of-things (IoT) devices, to operate as bots in a botnet that launches the attack.

It is with respect to these and other general considerations that the aspects disclosed herein have been made. Also, although relatively specific problems may be discussed herein, it should be understood that the examples should not be limited to solving the specific problems identified in the background or elsewhere in this disclosure.

SUMMARY

Examples of the present disclosure describe systems and methods for intelligent manipulation of distributed-denial-of-service (DDoS) attack traffic. In an example, a method for intelligent manipulation of DDoS attack traffic may include receiving, at a traffic management system, a first stream of packets from a router on a first link and a second stream of packets from the router on a second link. In examples, the first stream of packets may include traffic from a first network element operatively connected to the router and the second stream of packets may include traffic from a second network element operatively connected to the router. The method may further include determining flow information about the first stream. In examples, the flow information may indicate that the first network element has received at least one packet from the router that may include a first source Internet protocol (IP) address and a first destination IP address. In examples, at least a first parameter of the first stream may indicate that the first network element has sent a return packet to the source IP address. The method may further include sending, by the traffic management system, a routing policy update. In examples, the routing policy update may cause at least a routing table at the router to be updated to require that all traffic received by the router having the first source IP address and the first destination IP address be routed to the first network element for a period of time.

In an example, a system for intelligent manipulation of DDoS attack traffic may include at least one processor and a memory, operatively coupled to the at least one processor. In examples the memory may store computer executable instructions that, when executed by the at least one processor, cause the system to perform a method. In an example, the method may include receiving, at a traffic management system, a first stream of packets from a router on a first link and a second stream of packets from the router on a second link. In examples, the first stream of packets may include traffic from a first network element operatively connected to the router and the second stream of packets may include traffic from a second network element operatively connected to the router. The method may further include determining flow information about the first stream. In examples, the flow information may indicate that the first network element has received at least one packet from the router that may include a first source Internet protocol (IP) address and a first destination IP address. In examples, at least a first parameter of the first stream may indicate that the first network element has sent a return packet to the source IP address. The method may further include sending, by the traffic management system, a routing policy update. In examples, the routing policy update may cause at least a routing table at the router to be updated to require that all traffic received by the router having the first source IP address and the first destination IP address be routed to the first network element for a period of time.

In another example, a system for intelligent manipulation of DDoS attack traffic may include a router, a first network element, operatively connected to the router, a second network element, operatively connected to the router, and a traffic management system, operatively connected to the router. In an example, the traffic management system may be configured to receive a first stream of packets from the router on a first link and a second stream of packets from the router on a second link. In examples, the first stream of packets may include traffic from the first network element and the second stream of packets may include traffic from the second network element. The traffic management system may further be configured to determine flow information about the first stream. In examples, the flow information may indicate that the first network element has received at least one packet from the router that may include a first source Internet protocol (IP) address and a first destination IP address. In examples, at least a first parameter of the first stream may indicate that the first network element has sent a return packet to the source IP address. The traffic management system may further be configured to send a routing policy update. In examples, the routing policy update may cause at least a routing table at the router to be updated to require that all traffic received by the router having the first source IP address and the first destination IP address be routed to the first network element for a period of time.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

In examples, a DDoS attack may overwhelm or overburden a target system with illegitimate, malicious traffic. While the target system is overburdened with malicious traffic, it has less capacity to handle legitimate traffic. Mitigation of a DDoS attack generally includes filtering the malicious traffic directed to the target system (e.g., part of a DDoS attack). After the malicious traffic is filtered out, the clean (e.g., valid) traffic may be sent to the target system for processing. In examples, the filtering can be performed by one or more network devices, such as scrubbing devices.

Scrubbing devices may operate to test the legitimacy of source addresses in packets that are addressed to a protected target system. For example, one form of a DDoS attack may include spoofing the source address of packets. In order to mitigate this type of attack, the scrubbing devices may interrogate (e.g., provide a challenge back to) the source address included in packets that have a destination address of a protected target system. Responses to such challenges will indicate whether the source address(es) included in the packets are legitimate. If not, then the illegitimate source address may be added to the filter lists of the network's scrubbing devices, and additional traffic (e.g., packets) from that source address may be filtered out before being delivered to the destination address of the protected target system.

In order for the challenge/response mechanism to be effective, however, responses to challenges from scrubbing devices need to be routed back to the same scrubbing device that issued the challenge. This is complicated by the fact that a plurality of scrubbing devices and plurality of managed security routers may be employed in a network. In addition, during DDoS attack mitigation event, the router(s) of a network may normally be configured to route traffic for a particular destination address (target system) to any available scrubbing device or rotate/split the routing of traffic for a particular destination address to different scrubbing devices. While this is helpful for load balancing, it does not guarantee that the response to a challenge from a particular scrubbing device will be routed back to that same scrubbing device. As such, the challenge/response mechanism for verifying the legitimacy of a source address may be complicated in networks with multiple scrubbing devices and/or multiple routers.

The present technology provides systems and methods for intelligent manipulation of distributed-denial-of-service (DDoS) attack traffic. In examples, the provided systems and methods strategically manipulate routing information on a network based on detecting traffic coming from a network device, such as a scrubbing device. For example, a traffic management system may: (a) detect when the scrubbing device has issued a challenge to a source address for traffic having a particular destination address; and (b) temporarily direct all traffic having that same source address/destination address pair to the particular scrubbing device issuing the challenge. This will help ensure that any response to the challenge will be directed to the same scrubbing device that issued the challenge. In examples, the systems and methods include dynamically determining how long the traffic will be routed to a particular scrubbing device during a DDoS mitigation event.

As discussed, a network device (e.g., scrubbing device) may test the legitimacy of a source IP address by issuing a challenge to the source IP address and inspecting the response that is returned. The challenge is delivered from the scrubbing device through a router (e.g., a managed security router in a scrubbing center) to the source IP address named in the packet(s). In implementations, the system may include a traffic manager that receives mirrored traffic that the router receives back from the scrubbing device(s). In examples, the traffic manager may detect specific characteristics of the traffic to determine whether a challenge has been issued to a source address. For example, the traffic manager may detect a return packet from a network element, where the return packet has a particular transmission control protocol (TCP) flag set, indicating that a challenge has been issued. The traffic manager can determine, from the return packet, the challenged source IP address and the destination address to which the alleged source IP address was attempting to send traffic. In addition, the traffic manager, in examples, can differentiate between traffic from different scrubbing devices based on the link over which the management device receives the mirrored traffic from the router.

In implementations, the traffic manager may ensure that the response to the challenge is routed to the same network device (e.g., scrubbing device) that issued the challenge by temporarily updating a routing policy of the router (e.g., a managed security router of a scrubbing center). During the time the temporary routing policy is in effect, all traffic from the challenged source IP address to the protected target system (having the identified destination IP address) is routed to the same scrubbing device that issued the challenge. The scrubbing device issuing the challenge can then determine (based on any response to the challenge) whether the source IP address is illegitimate. If so, the source IP address may be added to the filter list for the scrubbing device(s), and future traffic from the source IP address directed to the protected target system may be appropriately filtered.

Figure 1:
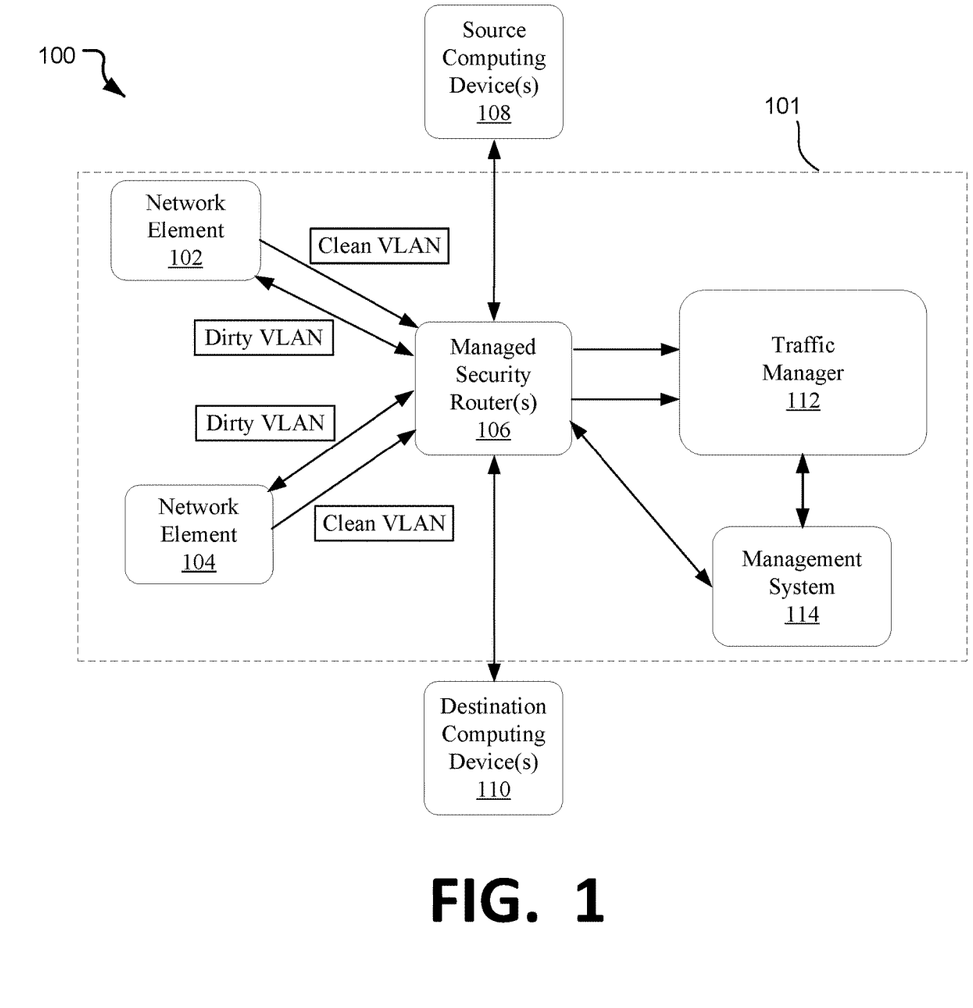
FIG. 1 depicts an example system for intelligent manipulation of distributed-denial-of-service (DDoS) attack traffic.

FIG. 1 depicts an example system 100 for intelligent manipulation of distributed-denial-of-service (DDoS) attack traffic. In examples, provider system 101 may comprise one or more networks and a plurality of networking devices that receive packets from source computing device(s) 108 for delivery to destination computing device(s) 110. In some examples, destination computing device(s) 110 may be owned or controlled by a customer of the services provided by provider system 101, including DDoS mitigation services to protect destination computing device(s) 110 from unwanted traffic.

In an implementation, one or more managed security router(s) 106 may receive data packets from one or more source computing device(s) 108. The managed security router 106 may receive the packets from source computing device(s) 108 via one or more networks or intervening devices, such as, in examples, router(s) and switch(es) that comprise provider system 101. In various implementations, each data packet may include a source Internet protocol (IP) address and a destination Internet protocol (IP) address. In such examples, the source IP address may identify a particular source computing device that appears (from the packet) to have transmitted the data packet (if the source IP address was not spoofed). The destination IP address may identify a particular destination computing device to which the data packet is intended to be transmitted.

In examples, managed security router(s) 106 (and/or intervening devices between the source computing device(s) 108 and the managed security router 106) may be configured to cause the data packets addressed to one or more destination computing device(s) 110 to be routed to the managed security router(s) 106 under certain conditions. For example, the managed security router may be part of, or operatively connected to, a scrubbing center with a variety of network elements (e.g., 102 and 104) used to filter out suspected DDoS traffic before delivering packets to destination computing device(s) 110. In examples, packets received by provider system 101 and addressed to destination computing device(s) 110 may be routed to the managed security router(s) 106 when a DDoS attack on the destination computing device(s) 110 has been detected or is suspected (collectively, a DDoS attack condition). Such a determination of a DDoS attack condition may be made, e.g., by a customer (e.g., the owner of the destination computing device(s) 110), automatically by a threat intelligence service (which may or may not be part of the provider system 101), by an administrator of the provider system 101, or otherwise. In examples, upon detection of the DDoS attack condition for a particular customer, all packets from source computing device(s) 108 received by provider system 101 that are addressed to that customer's destination computing device(s) 110 may be routed to the managed security router(s) 106. In other examples, for some customers, all traffic received by provider system 101 addressed to the destination computing device(s) 110 for that customer are routed to the managed security router(s) 110, regardless of any DDoS attack condition.

In examples, the managed security router(s) 106 transmit the data packets to network element 102 or network element 104 for filtering. In examples, the network elements 102 and 104 may comprise scrubbing devices, scrubbing servers, or the like, and although two are illustrated, more network elements may be provided. In examples, each of the network elements 102 and 104 is configured to receive traffic from the managed security router(s) 106 on a "dirty" virtual local area network (VLAN). The network elements 102 and 104 apply filters to the pre-filtering traffic received on the dirty VLAN and return filtered traffic to the managed security router(s) 106 on a separate, clean VLAN. In examples, a dirty VLAN and a clean VLAN may be defined between each of the network elements 102, 104 and each of the managed security router(s) 106. In examples, the VLANs may be port-based (static) or use-based (dynamic). In examples, each VLAN can be identified by a VLAN identifier, and the VLAN identifier may be translated to a VLAN tag used in the header of packets sent between the network elements (e.g., 102, 104) and the managed security router(s) 106 to identify the relevant VLAN.

In examples, the filters applied by the network elements 102 and 104 may include access-deny lists, access-permit lists, filtering logic rules, or otherwise. In examples, the filters may be based, at least in part, on a combination of the source IP address and the destination IP address in the packets. In some examples, the network elements 102 and 104 may not have any information about a source IP address that is included in a packet received on the dirty VLAN, and they may be configured to test the legitimacy of the source IP address in order to determine whether to add the source IP address (and/or the source IP address/destination IP address pair) to their filter(s).

In some examples, testing the legitimacy of a source IP address may include sending a challenge to the source IP address. In examples, if the source IP address has been spoofed (that is, the source computing device that sent the packet(s) is not legitimately associated with the source IP address in the packet(s)), then when the challenge is returned to the source IP address, it will generally be ignored (by the legitimate device that is associated with that source IP address). If the challenge from the network element (e.g., 102 or 104) is not adequately responded to within a prescribed period of time, the source IP address may be considered spoofed, and the spoofed source IP address may be added to filter(s) applied by the network element(s) 102, 104. In other examples, the failure to receive an adequate response is used, along with other information, in a weighted determination of the validity of the source IP address. If an adequate response to the challenge is received, in examples, the source IP address may be considered valid, and the source IP address may be added to a verified list of source IP addresses (e.g., access permit list) or otherwise used in a weighted determination of whether to permit traffic from the source IP address to be delivered to the destination computing device(s) 110.

One challenge that can arise in using a challenge/response mechanism to test the validity of a source IP address is that the network element 102, 104 that issued the challenge needs to be ensured to receive the response. For example, if network element 102 issued the challenge, and a legitimate source computing device 108 responds, but the response is routed by the managed security router 106 to network element 104, then the network element 102 may assume (after a period) that the source IP address has been spoofed. As such, the source IP address that was challenged may improperly be considered spoofed by network element 102 (and traffic from that source IP address may subsequently be filtered out).

In examples, the system may include a traffic manager that receives mirrored traffic that managed security router(s) 106 receive back from the network element(s) 102, 104 on their respective dirty VLAN. In examples, although the dirty VLAN allows bidirectional communication, very little traffic is returned from the network elements 102, 104 to the managed security router(s) 106 on the dirty VLAN. As such, mirroring traffic received from the network elements 102, 104 is not significantly burdensome on the managed security router(s) 106.

In examples, the traffic manager 112 may also detect specific characteristics of the mirrored traffic to determine whether a challenge has been issued to a source IP address from one of the network elements 102, 104. For example, the mirrored traffic received on the dirty VLAN from a network element 102, 104 at the managed security router(s) 106 may include one or more flags (e.g., a TCP flag) or other indicators that demonstrate that the network element 102 or 104 has issued a challenge back to the source IP address. The challenge is delivered by the managed security router(s) 106 to the source IP address, and the mirrored traffic from the dirty VLAN(s) is used by the traffic manager 112 to ensure that any response to the challenge is routed back to the network element 102, 104 that issued that challenge.

In examples, the traffic manager 112 may differentiate between different network elements 102, 104 based on the link over which the traffic manager receives the mirrored traffic from the managed security router(s) 106. This is discussed further below in relation to FIG. 2. In various implementations, the traffic manager 112 may be responsible for ensuring that the responses to the challenges issued to a particular source IP address are returned to the same network element that issued the challenge. As illustrated in FIG. 1, managed security router(s) 106 may be operatively connected with traffic manager 112 and management system 114. In an implementation, traffic manager 112 may detect when network element 102 and/or network element 104 has issued a challenge to a particular source IP address. The mirrored return packet comprising the challenge, in examples, indicates both: (a) the source IP address (to which the challenge is issued); and (b) the destination IP address of the destination computing device(s) 110 (to which the original traffic was directed).

In various implementations, traffic manager 112 may temporarily direct all traffic having that same source IP address and destination IP address to the particular network element (e.g., network element 102 or network element 104) that issued the challenge. In implementations, traffic manager 112 may ensure that the response to the challenge is routed to the correct network element by temporarily updating a routing policy of managed security router(s) 106, e.g., by providing instructions to management system 114. Management system 114, which may comprise one or more management server(s)/network(s), may then issue routing policy instructions to the managed security router(s) 106 to temporarily direct all traffic having that source IP address/destination IP address pair to the particular network element 102, 104 that issued the challenge. In various implementations, while the temporary routing policy is in effect, all traffic having that source IP address/destination IP address pair is routed by managed security router(s) 106 to the same network element (e.g., network element 102 or network element 104) that issued the challenge. In examples, the network element that issued the challenge (or some other operatively connected threat-mitigation system) can then determine, based on the response to the challenge (or failure to respond within a preset period), whether the source IP address is legitimate. In various implementations, if the source IP address is determined to be illegitimate, the source IP address may be added to a filter list for the network elements 102, 104, and future traffic from the source IP address directed to provider system 101 may be appropriately filtered, blocked, or the like.

Figure 2:
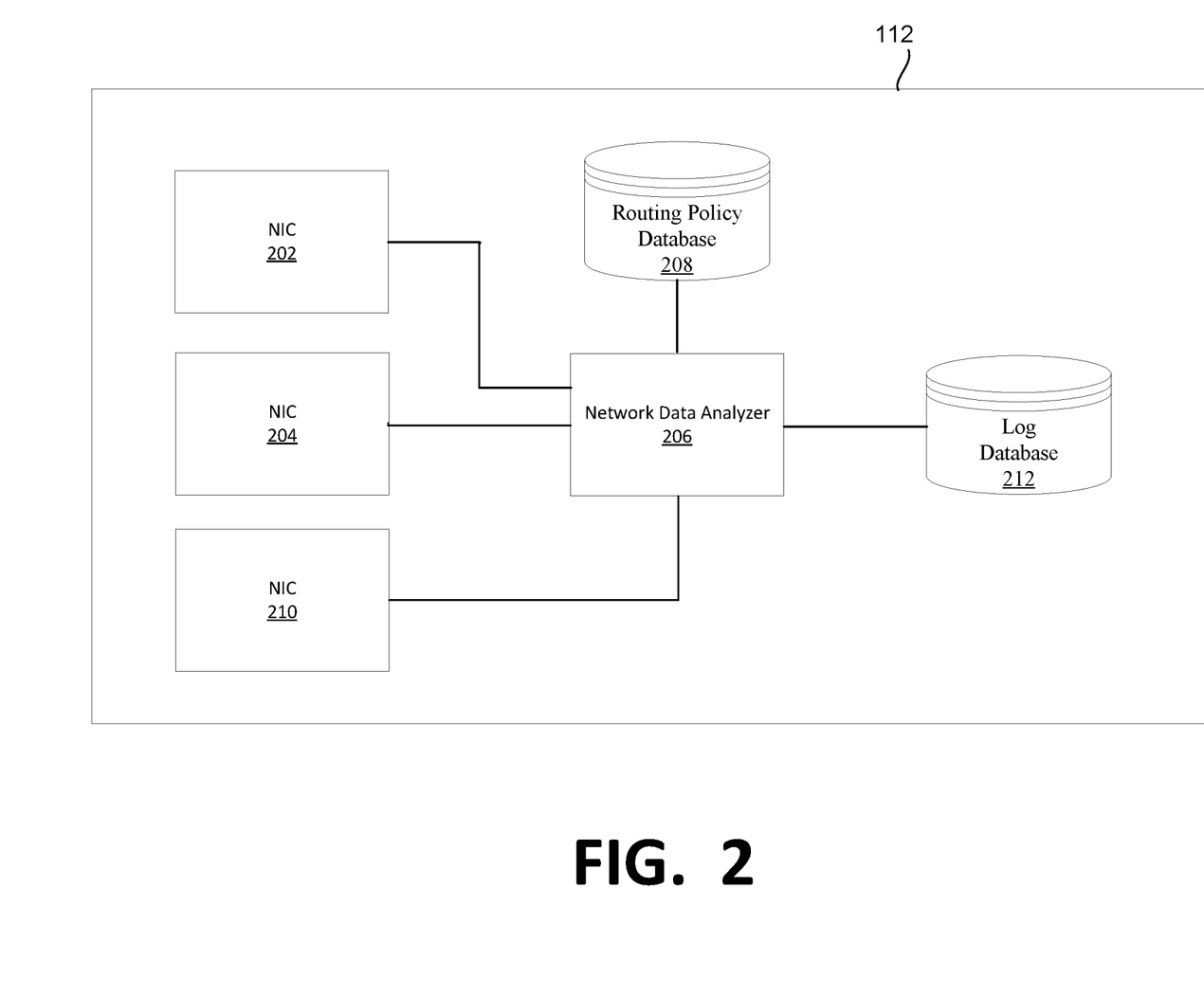
FIG. 2 depicts an example traffic manager.

Referring now to FIG. 2, an example traffic manager 112 is illustrated. As illustrated, traffic manager 112 may include several network interface cards (NICs), such as NIC 202, NIC 204, and NIC 210. In various implementations, NICs 202, 204, 210 may be network interface controllers, network adapters, LAN adapters, or the like. In implementations, NIC 202 and NIC 204 may be configured to allow traffic manager 112 to communicate with managed security routers, such as managed security router(s) 106 as depicted in FIG. 1. In examples, physical or virtual connections between managed security router(s) 106 and NIC(s) 202 and 204 may be referred to as "links." In various implementations, return traffic on the dirty VLAN from network device 102 may be mirrored by managed security router(s) 106 and received over a first link on NIC 202. Similarly, return traffic on the dirty VLAN from network device 104 may be mirrored by managed security router(s) 106 and received over a second link on NIC 204.

In examples, the mirrored packets received on the NICs 202 and 204 may, themselves, be dropped by traffic manager 112, but flow information about such packets may be extracted and analyzed by network data analyzer 206. For example, the network data analyzer 206 may include a NetFlow collector, which may comprise a device that collects NetFlow protocol information about the traffic received on NICs 202 and 204. Network data analyzer 206 may also include a NetFlow data analyzer daemon, which may comprise one or more application, module, device, or other system to analyze the flow information and determine any actions to be taken based on such flow information. In examples, the flow information (e.g., NetFlow information) may include metadata about the packets received on the NICs 202 and 204, such as source IP address, destination IP address, and whether the packets include any parameters (e.g., particular flags or other indicators) indicating that the packet is a challenge being sent back to the source IP address. As discussed, the challenge packet mirrored to the NIC 202 or 204 may include: (a) the source IP address (that was included in the original packet causing the challenge to be issued); (b) the destination IP address included in the original packet; and (c) the parameter indicating that the source IP address is being sent a challenge. Because each NIC 202, 204 is correlated to a particular network device 102, 104, based on the NIC (e.g., 202 or 204) that receives the mirrored traffic, the flow information may also indicate which network device 102, 104 issued the challenge.

As discussed above, traffic manager 112 may be responsible for ensuring that a response from the source IP address to the challenge is routed to the same network element 102 or 104 that sent the challenge. Therefore, and in various implementations, a routing policy update may be generated or initiated by traffic manager 112. For example, the network data analyzer 206 may determine that the flow information indicates that network device 102 has issued a challenge to a first source IP address, and the challenge packet specifies a first destination IP address. Network data analyzer may check whether a current routing policy already exists for that first source IP address/first destination IP address pair. In examples, the network data analyzer 206 may query a routing policy database 208. In various implementations, routing policy database 208 may store routing policies that are applied for determined periods of time by traffic manager 112 within provider system 111. In examples, a query may determine, e.g., whether the routing policy database 208 includes a routing policy for the first source IP address/first destination IP address pair and whether the routing policy is still in force (e.g., a time-to-live has not expired). In some examples, if a routing policy is already in force for the first source IP address/first destination IP address pair, the network data analyzer 206 may take no further action. In other examples, the network data analyzer 206 may extend the time-to-live for the current routing policy or take other action.

If no current routing policy for the first source IP address/first destination IP address pair, the network data analyzer 206 may generate such policy (or instructions to cause the policy to be generated by management system 114). For example, the network data analyzer 206 may cause a routing policy to be generated that will instruct the managed security router(s) 106 to route all traffic received from source computing device(s) 108 having the first source IP address/first destination IP address pair to be routed to network device 102 (the network device that issued the challenge indicated by the flow information) for a determined period of time. In examples, the period of time for which the routing policy is to be enforced can be expressed as a time-to-live parameter or otherwise and can be preset or dynamically determined based, e.g., on network conditions. In examples, the determined period should be long enough to capture any response to the challenge, but not so long as to adversely affect the load balancing normally performed by the managed security router(s) 106.

In examples, the network data analyzer 206 may cause the routing policy database 208 to be updated to reflect the new policy for at least the determined period (e.g., as indicated by the time-to-live). For example, the policy (or instructions to create the policy) may be transmitted by the network data analyzer 206 via NIC 210 to management system 114. In examples, management system 114 may comprise an application programming interface to allow programmatic management of routing policies applied to the managed security router(s) 106.

In examples, the routing policy update applied by the management system 114 to the managed security router(s) 106 may cause a routing table at the managed security router(s) 106 to be updated, requiring that all packets received by the managed security router(s) 106 that have the designated source IP address/destination IP address pair to be routed to the network element (e.g., network element 102) designated in the routing policy update. As discussed, the routing policy update may be applied for a determined (e.g., temporary) period or length of time and may automatically expire. In this way, any response to a challenge from a network element 102, 104 is guaranteed to be returned to the same network element for a period of time. After expiration of the routing policy, the managed security device(s) 106 may resume sending traffic to different network elements 102, 104 normally, such as by implementing load balancing algorithms.

As illustrated, traffic manager 112 may also include log database 212. In various implementations, log database 212 may store records of routing policies applied, periods of time for which the routing polices are applied, flow information received, and the like.

Figure 3:
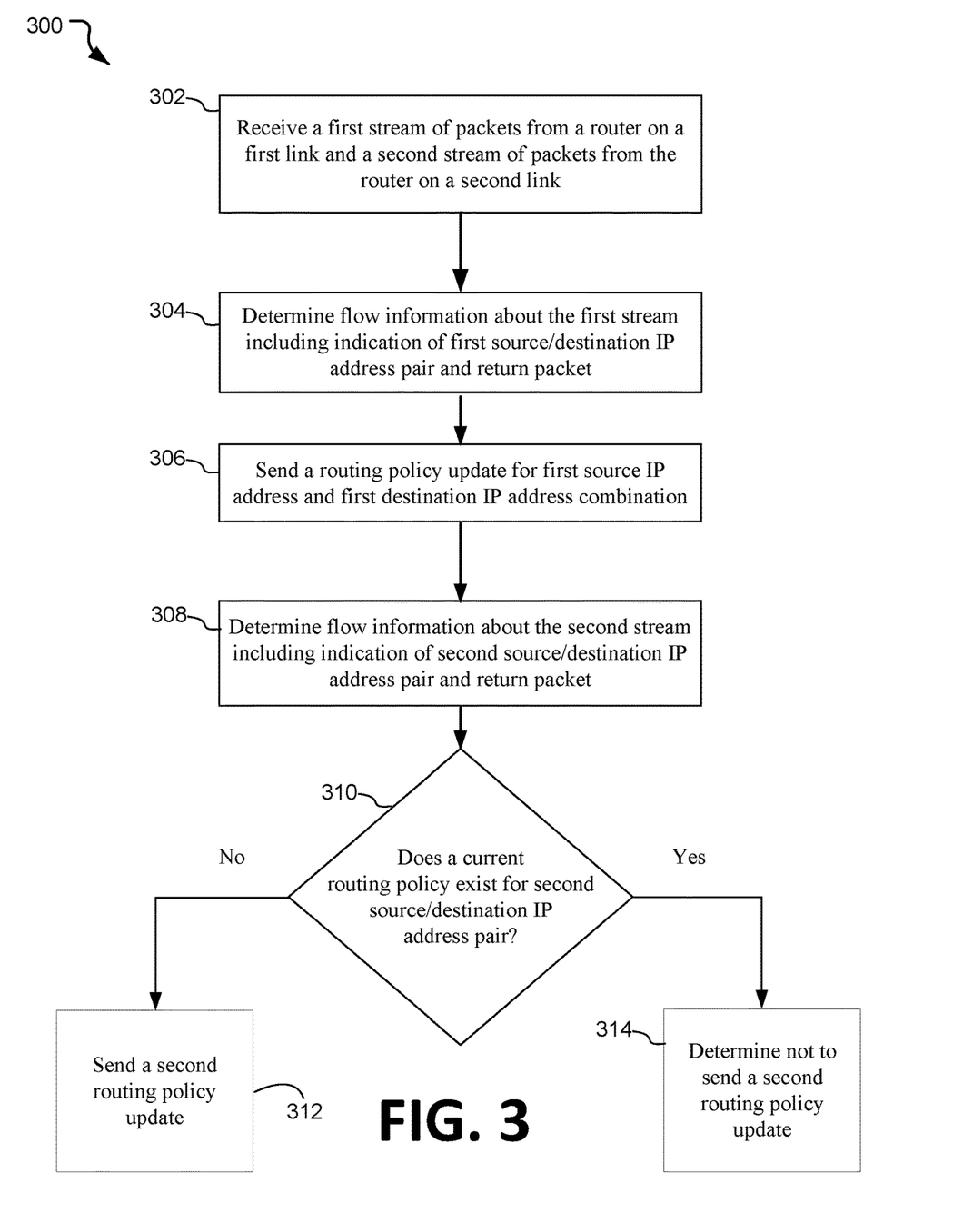
FIG. 3 depicts an example method for intelligent manipulation of distributed-denial-of-service (DDoS) attack traffic.

FIG. 3 depicts an example method for intelligent manipulation of distributed-denial-of-service (DDoS) attack traffic. In aspects, method 300 may be executed by one or more components of a system, such as system 100 of FIG. 1 and/or traffic manager 112 of FIG. 2. However, method 300 is not limited to such examples. Example method 300 begins at operation 302 as a first stream of packets from a router is received on a first link and a second stream of packets from the router is received on a second link. In examples, the router may be a managed security router, such as managed security router(s) 106 as depicted in FIG. 1, and the first stream may be received by the traffic manager 112 on NIC 202 and the second stream may be received by the traffic manager 112 on NIC 204. In various implementations, the first stream of packets may include traffic from a first network element (e.g., network element 102) operatively connected to the router, and the second stream of packets may include traffic from a second network element (e.g., network element 104) operatively connected to the router. In examples, the first and second network elements (e.g., 102, 104) may be scrubbing devices operatively connected to the router.

Example method 300 continues at operation 304 as flow information about the first stream of packets is determined. In examples, the flow information may be collected (e.g., by network data analyzer 206) according to a network flow analysis protocol, such as NetFlow, or the like. In examples, the flow information about the first stream of packets may indicate that the first network element (e.g., 102) has received at least one packet from the router that comprises a first source Internet protocol (IP) address and a first destination IP address. In examples, a first parameter of the first stream may indicate that the first network element (e.g., 102) has sent a return data packet to the source IP address. For example, as discussed, the return data packet may comprise (and provide an indicator of) a challenge issued by the first network element to test the legitimacy of the source IP address, and the return packet that comprises the challenge may include both the first source IP address and the first destination IP address. In addition, the link on which the return packet is received (e.g., via NIC 202) may indicate that it was the first network element (e.g., 102), as opposed to a different network element (e.g., 104), that sent the return packet.

Example method 300 continues at operation 306 as a routing policy update is made for the first source IP address and first destination IP address combination. As discussed, the routing policy update may be sent to the managed security router (e.g., managed security router(s) 106 as depicted in FIG. 1) by a traffic manager (e.g., traffic manager 112 as depicted in FIG. 1) and/or by a management system (e.g., management system 114 as depicted in FIG. 1). In various implementations, the managed security router may be instructed, via the routing policy, to route network traffic having the first source IP address and the first destination IP address to the first network element (e.g., 102). In various implementations, the routing policy update may cause a routing table at the router to be updated to require that all traffic received by the router having the first source IP address and the first destination IP address be routed to the first network element. In implementations, the routing policy may be temporary, and the managed security router may be instructed to apply the updated routing policy for only a certain period of time. In further examples, the certain period of time may be preset or may be determined dynamically. For example, it may be based on current network conditions or other factors. In examples, as discussed, prior to operation 306 (or any routing policy updated), a determination may be made whether a current routing policy is in effect for the first source IP address/first destination IP address pair. For simplicity of discussion, this is addressed below in relation to operation 310 regarding flow information for the second stream, but one of skill in the art will appreciate that a similar procedure may be followed with respect to the first stream.

Example method 300 continues at operation 308 as flow information about the second stream is determined. In examples, the flow information may be collected (e.g., by network data analyzer 206) according to a network flow analysis protocol, such as NetFlow, or the like. In examples, a second parameter of the second stream may indicate that the second network element (e.g., 104) has sent a return data packet to a source IP address. For example, as discussed, the return data packet may comprise (and provide an indicator of) a challenge issued by the second network element to test the legitimacy of the source IP address, and the return packet may include both the source IP address and the destination IP address. In some examples, the source IP address may be the same as the first source IP address detected in the first stream or may be different source IP address. Further, in examples, the destination IP address may be the same as the first destination IP address detected in the first stream or may be different destination IP address. The source IP address and the destination IP address pair included in the return packet detected in the second stream may be referred to as a second source/destination IP tuple (or pair). In addition, the link on which the return packet is received (e.g., via NIC 204) may indicate that it was the second network element (e.g., 104), as opposed to a different network element (e.g., 102), that sent the return packet.

Example method 300 continues at operation 310, where it is determined whether a current routing policy exists for the second source/destination IP address pair. As described above, routing policies may be stored in a routing policy database, such as routing policy database 208 as depicted in FIG. 2. In various implementations, determining whether a current routing policy exists for the second source/destination IP address may include querying the routing policy database. In examples, the second source/destination IP address pair may match the first source/destination IP address pair or another source/destination IP address pair already subject to a current routing policy. In such examples, a routing policy to a particular network element may already be in place. As such, if a current routing policy exists for the second source/destination IP address pair, then example method 300 may end at operation 314, as a second routing policy update is not made. Otherwise, if a current routing policy does not exist for the second source/destination IP address pair, then example method 300 completes at operation 312 as a second routing policy update is made, e.g., in a manner similar to operation 306.

Figure 4:
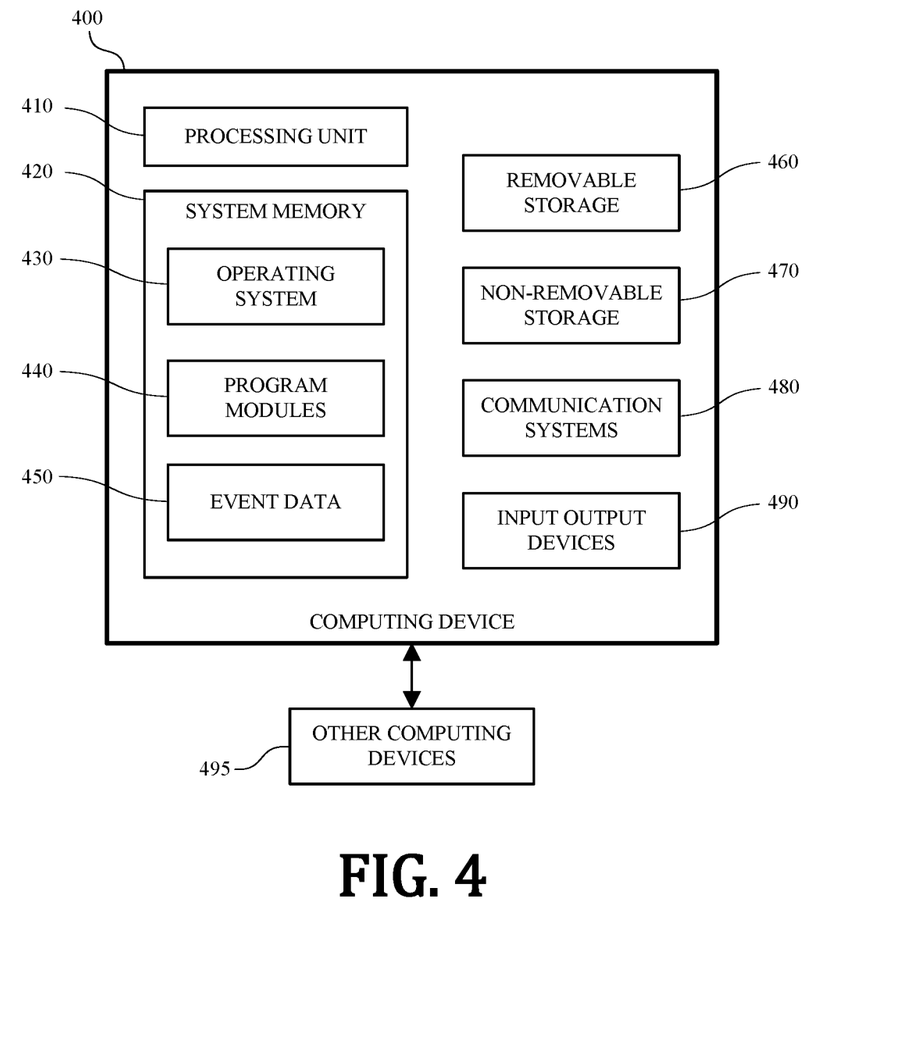
FIG. 4 depicts an example computing environment in which aspects of the present application may be practiced.

FIG. 4 is a block diagram of an example computing device 400. The computing device 400, or various components and systems of the computing device 400, may be integrated or associated with the network elements 102, 104, managed security router(s) 106, source computing device(s) 108, destination computing device(s) 110, traffic manager 112, management system 114, and/or other elements of system 100. As shown in FIG. 4, the physical components (e.g., hardware) of the computing device are illustrated and these physical components may be used to practice the various aspects of the present disclosure. The elements described above, may be implemented via one or more computing devices 400.

The computing device 400 may include at least one processing unit 410 and a system memory 420. The system memory 420 may include, but is not limited to, volatile storage (e.g., random access memory), non-volatile storage (e.g., read-only memory), flash memory, or any combination of such memories. The system memory 420 may also include an operating system 430 that controls the operation of the computing device 400 and one or more program modules 440. The program modules 440 may be responsible for gathering or determining event data 450 including endpoint data and/or network data. A number of different program modules and data files may be stored in the system memory 420. While executing on the processing unit 410, the program modules 440 may perform the various processes described above.

The computing device 400 may also have additional features or functionality. For example, the computing device 400 may include additional data storage devices (e.g., removable and/or non-removable storage devices) such as, for example, magnetic disks, optical disks, or tape. These additional storage devices are labeled as a removable storage 460 and a non-removable storage 470.

Examples of the disclosure may also be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such a SOC device may include one or more processing units, graphics units, communications units, system virtualization units and various application functionality all of which are integrated (or "burned") onto the chip substrate as a single integrated circuit.

When operating via a SOC, the functionality, described herein, may be operated via application-specific logic integrated with other components of the computing device 400 on the single integrated circuit (chip). The disclosure may also be practiced using other technologies capable of performing logical operations such as, for example, AND, OR, and NOT, including but not limited to mechanical, optical, fluidic, and quantum technologies.

The computing device 400 may include one or more communication systems 480 that enable the computing device 400 to communicate with other computing devices 495 such as, for example, servers, routers, network devices, client computing devices, etc. Examples of communication systems 480 include, but are not limited to, wireless communications, wired communications, cellular communications, radio frequency (RF) transmitter, receiver, and/or transceiver circuitry, a Controller Area Network (CAN) bus, a universal serial bus (USB), parallel, serial ports, etc.

The computing device 400 may also have one or more input devices and/or one or more output devices shown as input/output devices 490. These input/output devices 490 may include a keyboard, a sound or voice input device, haptic devices, a touch, force and/or swipe input device, a display, speakers, etc. The aforementioned devices are examples and others may be used.

The term computer-readable media as used herein may include non-transitory computer storage media. Computer storage media may include volatile and nonvolatile, removable and non-removable media implemented in any method or technology for storage of information, such as computer readable instructions, data structures, or program modules.

The system memory 420, the removable storage 460, and the non-removable storage 470 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media is tangible and non-transitory, and does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

In regards to the processes in the flow diagrams of FIG. 3, it should be understood that the sequence of steps of the processes are not fixed, but can be modified, changed in order, performed differently, performed sequentially, concurrently, or simultaneously, or altered into any desired sequence, as recognized by a person of skill in the art.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A method, comprising:
receiving, at a traffic management system, a first stream of packets from a router on a first link and a second stream of packets from the router on a second link, wherein the first stream of packets comprises traffic from a first network element operatively connected to the router and the second stream of packets comprises traffic from a second network element operatively connected to the router;
determining flow information about the first stream, wherein the flow information indicates that the first network element has received at least one packet from the router that comprises a first source Internet protocol (IP) address and a first destination IP address, and wherein at least a first parameter of the first stream indicates that the first network element has sent a return packet to the source IP address;
sending, by the traffic management system, a routing policy update, wherein the routing policy update causes at least a routing table at the router to be updated to require that all traffic received by the router having the first source IP address and the first destination IP address be routed to the first network element.

2. The method of claim 1, wherein the routing policy update is applied for a determined period of time.

3. The method of claim 2, wherein the determined period of time is based upon the flow information.

4. The method of claim 1, further comprising:
determining flow information about the second stream, wherein the flow information indicates that the second network element has received at least one packet from the router that comprises a second source Internet protocol (IP) address and a second destination IP address, and wherein at least a second parameter of the second stream indicates that the second network element has sent a return packet to the second source IP address;
sending, by the traffic management system, a second routing policy update, wherein the second routing policy update causes at least a second routing table at the router to be updated to require that all traffic received by the router having the second source IP address and second destination IP address be routed to the second network element.

5. The method of claim 1, wherein the first network element is a scrubber.

6. The method of claim 5, wherein the first parameter of the first stream indicates that a challenge has been issued by the scrubber to the source IP address.

7. The method of claim 1, further comprising:
determining flow information about the second stream, wherein the flow information indicates that the second network element has received at least one packet from the router that comprises a second source Internet protocol (IP) address and a second destination IP address, and wherein at least a second parameter of the second stream indicates that the second network element has sent a return packet to the second source IP address;
determining that a current routing policy exists for the second source IP address and the second destination IP address; and
based on determining that the current routing policy exists, determining, by the traffic management system, not to send a second routing policy update.

8. A system comprising:
at least one processor; and
memory, operatively coupled to the at least one processor, the memory storing computer executable instructions that, when executed by the at least one processor, cause the system to perform a method comprising:
receiving, at a traffic management system, a first stream of packets from a router on a first link and a second stream of packets from the router on a second link, wherein the first stream of packets comprises traffic from a first network element operatively connected to the router and the second stream of packets comprises traffic from a second network element operatively connected to the router;
determining flow information about the first stream, wherein the flow information indicates that the first network element has received at least one packet from the router that comprises a first source Internet protocol (IP) address and a first destination IP address, and wherein at least a first parameter of the first stream indicates that the first network element has sent a return packet to the source IP address;

sending, by the traffic management system, a routing policy update, wherein the routing policy update causes at least a routing table at the router to be updated to require that all traffic received by the router having the first source IP address and the first destination IP address be routed to the first network element.

9. The system of claim 8, wherein the routing policy update is applied for a determined period of time.

10. The system of claim 9, wherein the determined period of time is based upon the flow information.

11. The system of claim 8, wherein the method further comprises:
determining flow information about the second stream, wherein the flow information indicates that the second network element has received at least one packet from the router that comprises a second source Internet protocol (IP) address and a second destination IP address, and wherein at least a second parameter of the second stream indicates that the second network element has sent a return packet to the second source IP address;
sending, by the traffic management system, a second routing policy update, wherein the second routing policy update causes at least a second routing table at the router to be updated to require that all traffic received by the router having the second source IP address and second destination IP address be routed to the second network element.

12. The system of claim 8, wherein the first network element is a scrubber.

13. The system of claim 12, wherein the first parameter of the first stream indicates that a challenge has been issued by the scrubber to the source IP address.

14. The system of claim 8, wherein the method further comprises:
determining flow information about the second stream, wherein the flow information indicates that the second network element has received at least one packet from the router that comprises a second source Internet protocol (IP) address and a second destination IP address, and wherein at least a second parameter of the second stream indicates that the second network element has sent a return packet to the second source IP address;
determining that a current routing policy exists for the second source IP address and the second destination IP address; and
based on determining that the current routing policy exists, determining, by the traffic management system, not to send a second routing policy update.

15. A system comprising:
a router;
a first network element, operatively connected to the router;
a second network element, operatively connected to the router; and
a traffic management system, operatively connected to the router and configured to:
receive a first stream of packets from the router on a first link and a second stream of packets from the router on a second link, wherein the first stream of packets comprises traffic from the first network element and the second stream of packets comprises traffic from the second network element;
determine flow information about the first stream, wherein the flow information indicates that the first network element has received at least one packet from the router that comprises a first source Internet protocol (IP) address and a first destination IP address, and wherein at least a first parameter of the first stream indicates that the first network element has sent a return packet to the source IP address;
send a routing policy update, wherein the routing policy update causes at least a routing table at the router to be updated to require that all traffic received by the router having the first source IP address and the first destination IP address be routed to the first network element.

16. The system of claim 15, wherein the routing policy update is applied for a determined period of time.

17. The system of claim 16, wherein the determined period of time is based upon the flow information.

18. The system of claim 15, wherein the first network element is a scrubber.

19. The system of claim 18, wherein the first parameter of the first stream indicates that a challenge has been issued by the scrubber to the source IP address.

20. The system of claim 15, wherein the traffic management system is further configured to:
determine flow information about the second stream, wherein the flow information indicates that the second network element has received at least one packet from the router that comprises a second source Internet protocol (IP) address and a second destination IP address, and wherein at least a second parameter of the second stream indicates that the second network element has sent a return packet to the second source IP address;
determine that a current routing policy exists for the second source IP address and the second destination IP address; and
based on determining that the current routing policy exists, determine not to send a second routing policy update.

* * * * *